(12) United States Patent
Isogai

(10) Patent No.: US 6,932,059 B2
(45) Date of Patent: Aug. 23, 2005

(54) FUEL INJECTION SYSTEM OF INTERNAL COMBUSTION ENGINE

(75) Inventor: Nobumasa Isogai, Hekinan (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/012,263

(22) Filed: Dec. 16, 2004

(65) Prior Publication Data

US 2005/0155579 A1    Jul. 21, 2005

(30) Foreign Application Priority Data

Jan. 15, 2004    (JP) .............................. 2004-008098

(51) Int. Cl.$^7$ .......................................... F02M 51/00
(52) U.S. Cl. ................................... 123/478; 123/480
(58) Field of Search ........................... 123/478, 480, 123/486, 445, 434, 472, 294

(56) References Cited

U.S. PATENT DOCUMENTS

| | | |
|---|---|---|
| 5,947,087 A | 9/1999 | Minowa et al. |
| 6,032,646 A | 3/2000 | Minowa et al. |
| 6,453,662 B1 | 9/2002 | Lewis et al. |
| 6,474,308 B2 * | 11/2002 | Okumura et al. ............ 123/491 |
| 2002/0078930 A1 | 6/2002 | Minowa et al. |
| 2004/0003586 A1 | 1/2004 | Lewis et al. |

FOREIGN PATENT DOCUMENTS

| | | |
|---|---|---|
| JP | 2002-250247 | 9/2002 |
| JP | 2003-120393 | 4/2003 |
| JP | 2004-218512 | 8/2004 |

* cited by examiner

Primary Examiner—Bibhu Mohanty
(74) Attorney, Agent, or Firm—Nixon & Vanderhye P.C.

(57) ABSTRACT

An electronic control unit (ECU) of a fuel injection system of an internal combustion engine stores correspondences defining each correspondence between an operating state and a correction value for each progression level of a change in the engine with time in advance. The ECU determines which progression level includes a present state of the change in the engine with time and selects the correspondence based on a result of the determination. Thus, even if a change in an error with time, which should be corrected, does not have an identical tendency corresponding to the operating state, the error can be suitably corrected by referring to the correspondence between the operating state and the correction value in each progression level.

2 Claims, 2 Drawing Sheets

FUEL INJECTION SYSTEM OF INTERNAL COMBUSTION ENGINE

CROSS REFERENCE TO RELATED APPLICATION

This application is based on and incorporates herein by reference Japanese Patent Application No. 2004-8098 filed on Jan. 15, 2004.

BACKGROUND OF THE INVENTION

1. Field of the Invention

The present invention relates to a fuel injection system of an internal combustion engine capable of improving accuracy of fuel injection.

2. Description of Related Art

A fuel injection system of an internal combustion engine mounted on a vehicle and the like supplies fuel into cylinders of the engine through injectors. The fuel injection system includes a control device for setting injection conditions such as an injection quantity or injection timing in accordance with a pressed degree of an accelerator as required torque or sensed operating states. Errors are caused in an actual injection quantity or actual injection timing due to operating characteristics of the injector and the like. Correction of the errors is important for improving accuracy of the fuel injection. A technology disclosed in Unexamined Japanese Patent Application Publication No. 2002-250247 (Patent Document 1) stores a weighting characteristic curve, in which a change in the injector with time is reflected, and calculates the change in the injector with time in reference to the weighting characteristic curve. Thus, the technology sets a correction value for correcting a driving period of the injector. An exponential function is proposed as an example of the weighting characteristic curve.

However, since the operating characteristics of the injector are not simple, the injection accuracy cannot be improved by simply reflecting the correction value in the driving period by multiplication or addition. Characteristics of the injection quantity Q with respect to the driving period TE are shown in FIG. 4. As shown in FIG. 4, generally, the injection quantity Q gradually increases as the driving period TE increases. A gradient of the increase of the injection quantity Q varies in accordance with an injection pressure Pc. The injection pressure Pc increases along a direction of an arrow mark Pc in FIG. 4. The characteristics before the change in the injector with time are shown by solid lines a, b, and c in FIG. 4, and the characteristics after the change in the injector with time are shown by broken lines a', b' and c' in FIG. 4. In a certain area (a point A in FIG. 4, for instance) of the driving period TE and the injection pressure Pc, the change in the injector with time affects the injection quantity Q so that the injection quantity Q increases. In another area (a point B in FIG. 4, for instance) of the driving period TE and the injection pressure Pc, the change in the injector with time affects the injection quantity Q so that the injection quantity Q decreases. Therefore, even if the single weighting characteristic curve is used as in the technology of Patent Document 1, the error in the fuel injection due to the change in the injector and the like with time cannot be absorbed (corrected) sufficiently. Since the characteristics of the injection quantity are not simple, the correction value cannot be suitably provided by a simple function such as an exponential function. Thus, the technology disclosed in Patent Document 1 cannot improve the injection accuracy sufficiently.

SUMMARY OF THE INVENTION

It is therefore an object of the present invention to provide a fuel injection system of an internal combustion engine capable of improving accuracy of fuel injection even if tendencies of errors in the fuel injection are complicated by changes in parts of the engine such as an injector with time.

According to an aspect of the present invention, a fuel injection system of an internal combustion engine includes correcting means and storing means. The correcting means corrects an error, which is caused by a change in the engine with time, with respect to a fuel injection command value based on a present state of the change in the engine with time. The fuel injection command value is set in accordance with an operating state of the engine. The storing means divides the state of the change in the engine with time into multiple progression levels. The storing means stores correspondences for defining each correspondence between the operating state and a correction value for each progression level. The correcting means determines which progression level includes the present state of the change in the engine with time and selects the correspondence based on a result of the determination.

Thus, even if a change in the error with time, which should be corrected, does not have an identical tendency corresponding to the operating state, the error can be suitably corrected by referring to the correspondence between the operating state and the correction value in each progression level of the change in the engine with time. The correspondence should preferably reflect a correspondence between the operating state in each progression level and an actual fuel injection quantity or the like. The change in the engine with time progresses relatively slowly. Therefore, the suitable correspondences can be set in the respective progression levels. The change in the error with time, which should be corrected, can be reflected in the correction more effectively than in the case where the correction value is calculated based on a weighting characteristic curve. Thus, fuel injection accuracy can be improved. Moreover, the correction can be performed much more easily than in the case where the correction is performed by optimizing the weighting characteristic curve.

According to another aspect of the present invention, the storing means defines the progression levels by dividing the state of the change in the engine with time based on values of a parameter indicating the state of the change in the engine with time. The storing means sets the values of the parameter so that an interval between the values of the parameter defining a range of a certain progression level increases as the change in the engine with time in the certain progression level progresses.

The change in the error in the fuel injection command value with time, which should be corrected, is large in its early stage. Then, the change in the error slackens, and the error substantially converges. Therefore, by increasing the interval between the values of the parameter defining a range of a certain progression level as the change in the engine with time in the certain progression level progresses, the number of the stored correspondences can be minimized while achieving the effect of the correction for improving the accuracy.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENT

Figure 1:
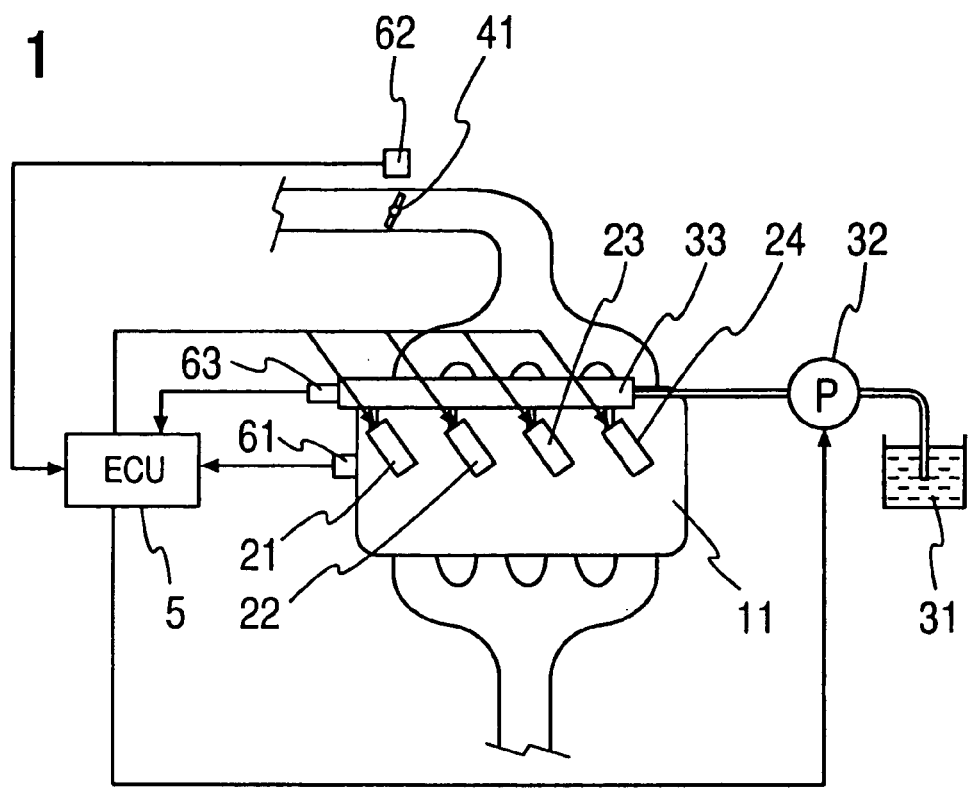
FIG. 1 is a schematic diagram showing a diesel engine equipped with a fuel injection system according to an embodiment of the present invention.

Referring to FIG. 1, a diesel engine as a compression ignition internal combustion engine equipped with a fuel injection system according to an embodiment of the present invention is illustrated. The present embodiment is applied to an automobile, for instance. Injectors 21, 22, 23, 24 are mounted to respective cylinders of an engine main body 11 on a one-on-one basis. An electronic control unit (ECU) 5 controls the injectors 21, 22, 23, 24 so that each one of the injectors 21–24 opens at predetermined timing for a predetermined period to inject fuel. Each one of the injectors 21–24 opens if a driving solenoid mounted thereto is energized. The energization period of the driving solenoid corresponds to the driving period of each one of the injectors 21–24. Each one of the injectors 21–24 injects the fuel for a period substantially corresponding to the energization period. The engine main body 11 is a general one and includes parts such as intake valves and exhaust valves mounted to the respective cylinders.

The fuel is supplied from a common rail 33 to the injectors 21–24. The common rail 33 is connected with a pump section 32. The pump section 32 draws low-pressure fuel from a fuel tank 31 and pressure-feeds the fuel to the common rail 33. A fuel pressure in the common rail 33 (a common rail pressure) defines an injection pressure of the injectors 21–24.

The ECU controls various parts of the engine such as the injectors 21–24 based on operating states sensed by sensors mounted to various parts of the engine. The various sensors include a rotation speed sensor 61 for sensing an engine rotation speed and a throttle position sensor 62 for sensing an opening degree of an intake throttle valve 41 (a throttle opening degree). A pressure sensor 63 for sensing the common rail pressure is mounted to the common rail 33. The ECU 5 controls the pump section 32 to conform the pressure sensed by the pressure sensor 63 to a set target pressure. Other sensors, which are usually mounted to the engine, are also used.

The ECU 5 is structured centering on a microcomputer. The ECU 5 calculates a target injection quantity based on the operating states including the engine rotation speed and the throttle opening degree, and sets the energization period defining the valve opening period of each one of the injectors 21–24.

Figure 2:
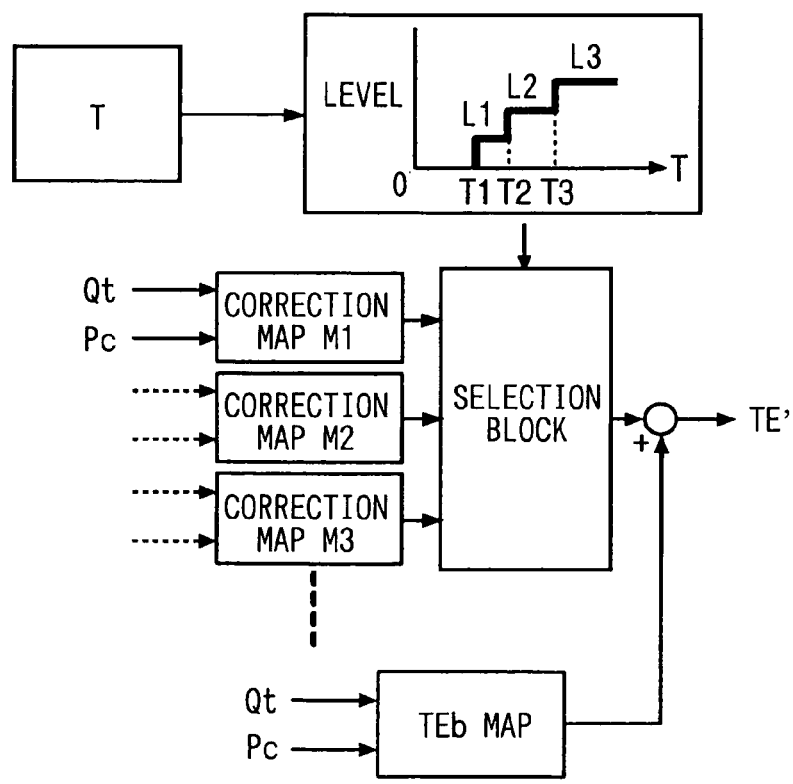
FIG. 2 is a block diagram showing a substantial part of a control function executed by an electronic control unit of the fuel injection system according to the embodiment.

A control function of the ECU 5 as correcting means and storing means for setting the energization period is shown in FIG. 2. The target injection quantity Qt and the common rail pressure Pc are inputted and a basic energization period TEb is calculated based on a basic energization period map (TEb MAP). The basic energization period map (TEb MAP) relates the inputs of the target injection quantity Qt and the common rail pressure Pc to the basic energization period TEb, and is stored in ROM of the ECU 5 with a control program, in advance.

A deterioration index T indicating deterioration with time is inputted. It is determined which progression level includes a present state of the deterioration (or a change) of a fuel injection system including the injectors 21–24 with time, based on the deterioration index T. An integrated value of an operation period of the engine is employed as the deterioration index T. The initial progression level is a level at which the correction of the error in the energization period due to the deterioration with time is unnecessary. Then, the progression level rises as the error increases. Thresholds of the deterioration index T as boundaries among the respective progression levels are stored in the ROM in advance. The correction is necessary in progression levels of a progression level L1, a progression level L2, a progression level L3, etc. shown in FIG. 2, and the deterioration with time progresses in that order. More specifically, as shown in FIG. 2, if the deterioration index T exceeds a first threshold T1, it is determined that the progression level L1 is reached. If the deterioration index T exceeds a second threshold T2, it is determined that the progression level L2 is reached. If the deterioration index T exceeds a third threshold T3, it is determined that the progression level L3 is reached. The result of the determination is outputted to a selection block shown in FIG. 2.

If the result of the determination that the progression level is the progression level L1 or over is inputted, the selection block selects a correction map corresponding to the progression level and outputs a correction period, which is added to the energization period for correcting the length of the energization period. The correction map is a map for relating the inputs of the target injection quantity Qt and the common rail pressure Pc to the correction period. The correction map is stored in the ROM in advance. In the present embodiment, multiple correction maps (a correction map M1, a correction map M2, a correction map M3, etc.) are stored. The correction map M1, M2, M3 respectively correspond to the progression levels L1, L2, L3. Each correction map is provided by obtaining a representative error in the injection quantity in each progression level for each operating state (the target injection quantity and the common rail pressure) through experimentation and the like in advance. Thus, the correction period of the energization period for suitably compensating for the error can be provided.

A corrected energization period TE' is obtained by adding the correction period to the basic energization period TEb. Each one of the injectors 21–24 opens for the corrected energization period TE', and injects the fuel.

Figure 3:
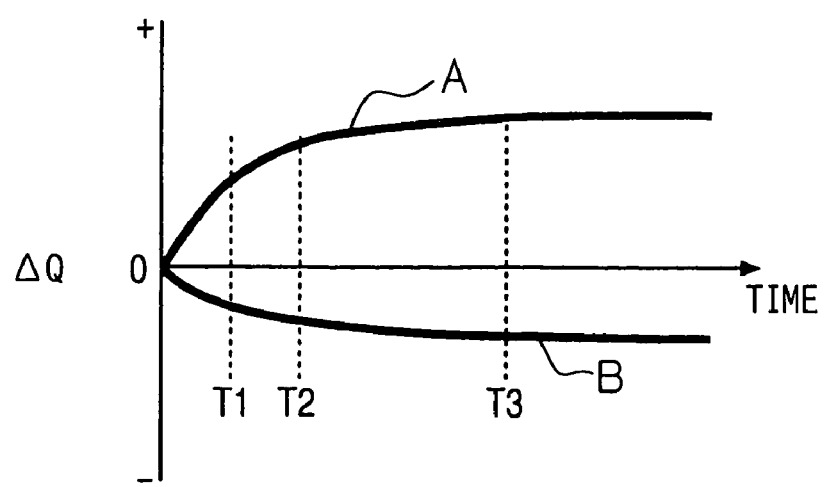
FIG. 3 is a graph showing a change in an injection quantity of the fuel injection system with time according to the embodiment.
Figure 4:
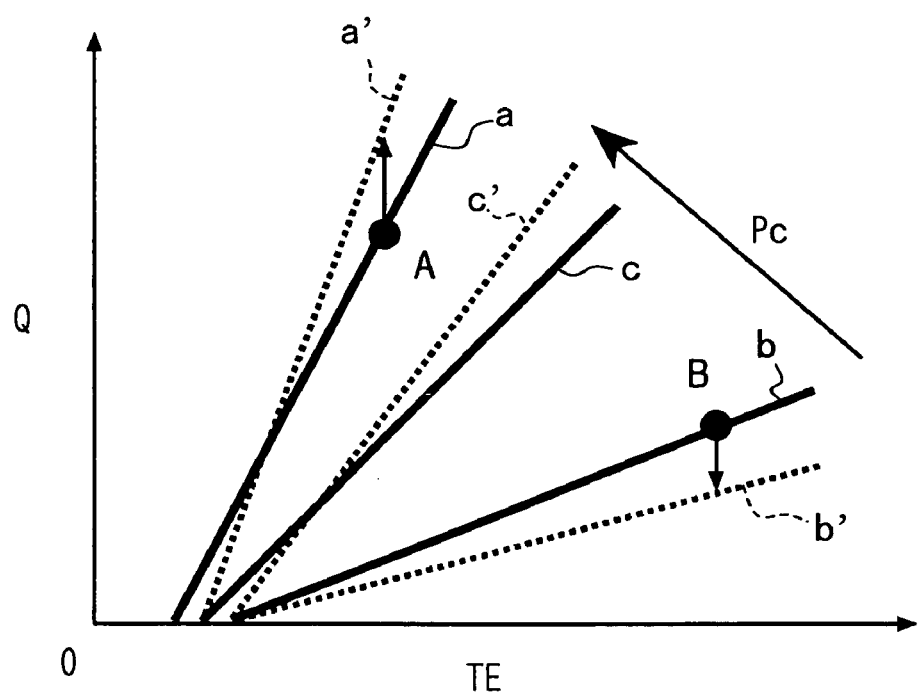
FIG. 4 is a graph showing relationships among the injection quantity, an injection pressure and an energization period of the fuel injection system according to the embodiment.

Intervals among the thresholds of the deterioration index T for defining ranges of the respective progression levels should be preferably set as follows. A change ΔQ in the injection quantity Q due to the deterioration with time is shown against time in FIG. 3. A solid line A in FIG. 3 indicates the change ΔQ in the injection quantity Q corresponding to the energization period TE and the injection pressure (the common rail pressure) Pc at a point A shown in FIG. 4. A solid line B in FIG. 3 indicates the change ΔQ in the injection quantity Q corresponding to the energization period TE and the injection pressure Pc at a point B shown in FIG. 4. Directions of changes ΔQ in the injection quantity Q at the points A, B differ from each other as shown in FIGS. 3 and 4. However, at either one of the points A, B, the change ΔQ in the injection quantity Q rapidly increases in an early stage, and then, slackens so that the error (the change ΔQ) converges as shown in FIG. 3. Therefore, the interval between the thresholds of the deterioration index T should be preferably increased as the deterioration with time in the progression level progresses. For instance, the range of the progression level L2 provided by the thresholds T1, T2 should be preferably set to be greater than the range of the progression level L1 provided by the threshold T1 (T1<T2−T1), and the range of the progression level L3 provided by the thresholds T2, T3 should be preferably set to be greater than the range of the progression level L2 provided by the thresholds T1, T2 (T2−T1<T3−T2). Thus, the number of the correspondences stored in the memory can be minimized while achieving an effect of the correction for improving the injection accuracy.

The change in the injection quantity with time due to the deterioration in the parts constituting the engine with time occurs in a much longer span of time than time length from start to stop of the engine. Therefore, even if the deterioration index T exceeds the threshold and the next progression level is reached during the operation of the engine, the progression level need not be renewed until the time when the power to the ECU is turned on the next time.

In the present embodiment, the integrated value of the operation period of the engine is employed as the deterioration index T. Alternatively, a travel distance, an integrated value of the engine rotation speed, or an integrated value of the fuel injection quantity may be employed as the deterioration index T. In the case where the integrated value of the fuel injection quantity is employed, a product of the number of times of the injections per unit time and the common rail pressure at that time may be integrated instead of directly integrating the fuel injection quantity. In the case where information such as the travel distance can be obtained from an ECU which controls meters, the deterioration index T may be renewed and it may be determined whether the deterioration index exceeds the threshold to the next progression level only when the power to the ECU 5 is turned on.

Other than the correction of the energization period, the present invention can be applied to the correction of the fuel injection command values such as the injection timing.

The present invention should not be limited to the disclosed embodiment, but may be implemented in many other ways without departing from the spirit of the invention.

What is claimed is:

1. A fuel injection system of an internal combustion engine, comprising:

correcting means for correcting an error, which is caused by a change in the engine with time, with respect to a fuel injection command value based on a present state of the change in the engine with time, the fuel injection command value being set in accordance with an operating state of the engine; and storing means for dividing the state of the change in the engine with time into multiple progression levels and for storing correspondences defining each correspondence between the operating state of the engine and a correction value for each progression level, the correction value being used to correct the error; wherein the correcting means determines which progression level includes the present state of the change in the engine with time and selects the correspondence based on a result of the determination.

2. The fuel injection system of the internal combustion engine as in claim 1, wherein the storing means defines the progression levels by dividing the state of the change in the engine with time based on values of a parameter indicating the state of the change in the engine with time, and sets the values of the parameter so that an interval between the values of the parameter defining a range of a certain progression level increases as the change in the engine with time in the certain progression level progresses.

* * * * *